United States Patent
Bonhomme

(10) Patent No.: US 8,371,797 B2
(45) Date of Patent: Feb. 12, 2013

(54) SECURED PALLETIZATION FACILITY

(75) Inventor: Eric Bonhomme, Octeville-sur-Mer (FR)

(73) Assignee: Sidel Participations, Octeville sur-Mer (FR)

( * ) Notice: Subject to any disclaimer, the term of this patent is extended or adjusted under 35 U.S.C. 154(b) by 406 days.

(21) Appl. No.: 12/680,446

(22) PCT Filed: Sep. 25, 2008

(86) PCT No.: PCT/FR2008/051712
§ 371 (c)(1),
(2), (4) Date: Mar. 26, 2010

(87) PCT Pub. No.: WO2009/050374
PCT Pub. Date: Apr. 23, 2009

(65) Prior Publication Data
US 2010/0310349 A1     Dec. 9, 2010

(30) Foreign Application Priority Data
Sep. 28, 2007   (FR) ..................... 07 06789

(51) Int. Cl.
*B23Q 11/08* (2006.01)
*F16P 3/02* (2006.01)
*B65G 57/00* (2006.01)
(52) U.S. Cl. .................... 414/799; 74/612
(58) Field of Classification Search .......... 414/788, 414/789.5, 799, 922, 923, 924, 927, 928, 414/929; 49/134; 52/64, 66; 53/157; 74/612–616
See application file for complete search history.

(56) References Cited

U.S. PATENT DOCUMENTS

| | | | | |
|---|---|---|---|---|
| 5,265,497 A * | 11/1993 | Curless | ............................ | 74/608 |
| 5,435,675 A * | 7/1995 | Rutschle | ......................... | 409/134 |
| 5,897,430 A * | 4/1999 | Haller | ............................ | 451/451 |
| 6,987,241 B2 * | 1/2006 | Hacker et al. | ............. | 219/121.86 |
| 7,192,225 B2 * | 3/2007 | Takayama et al. | ............. | 409/134 |
| 7,238,916 B2 * | 7/2007 | Samodell et al. | ........... | 219/125.1 |
| 2001/0003861 A1 * | 6/2001 | Mayr et al. | ................. | 29/407.04 |

FOREIGN PATENT DOCUMENTS

| | | |
|---|---|---|
| EP | 0 146 643 A1 | 7/1985 |
| EP | 1 445 221 A1 | 8/2004 |
| JP | 07097060 A * | 4/1995 |
| WO | 00/20309 A1 | 4/2000 |

* cited by examiner

*Primary Examiner* — Gregory Adams
(74) *Attorney, Agent, or Firm* — Sughrue Mion, PLLC

(57) ABSTRACT

The invention relates to facility including a robot (2) for supplying pallet preparation stations with products (3) of the crate type or different. The structure of the facility includes side walls (11) and doors (13, 14) for accessing the palletization stations A and B. The structure further includes a fixed wall (15) separating stations A and B, and a cowling (20) mobile from one station to the other and in the shape of a dihedron, for alternatively converting each palletization station A and B into a kind of pallet hatch, wherein said conversion is carried out automatically before the opening of the door for accessing a loaded pallet located in said hatch. The cowling (20) is directly actuated by the product handling robot (2).

11 Claims, 2 Drawing Sheets

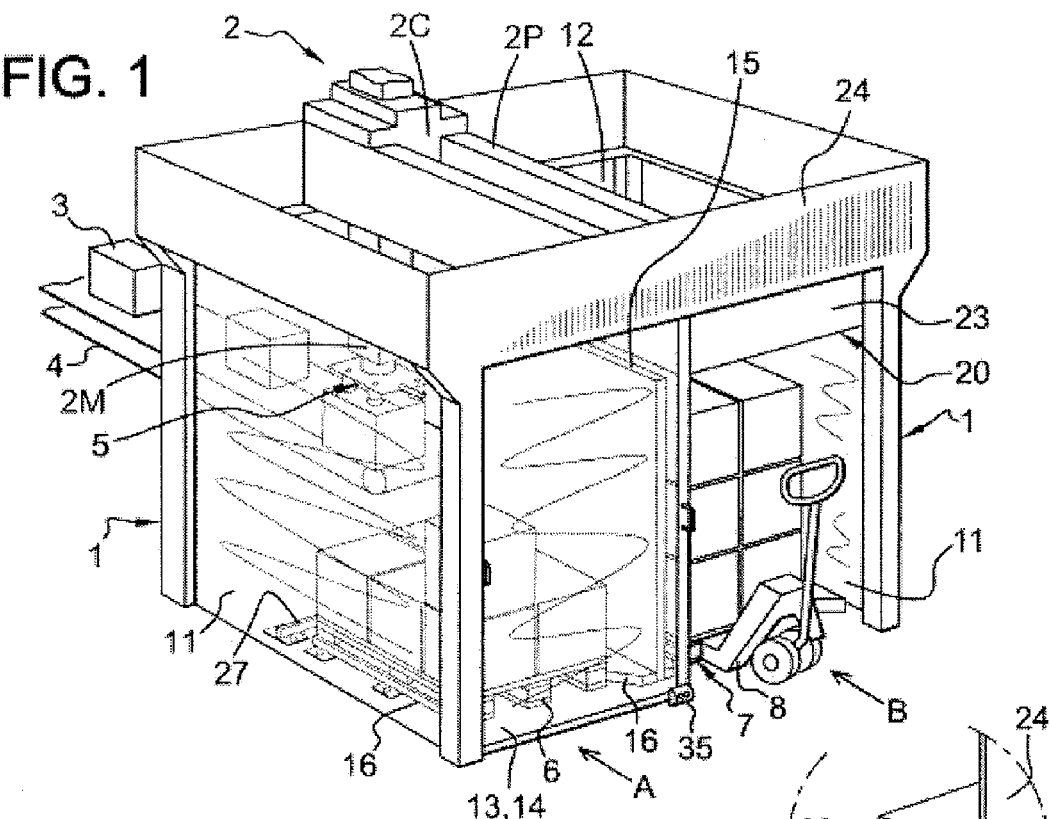
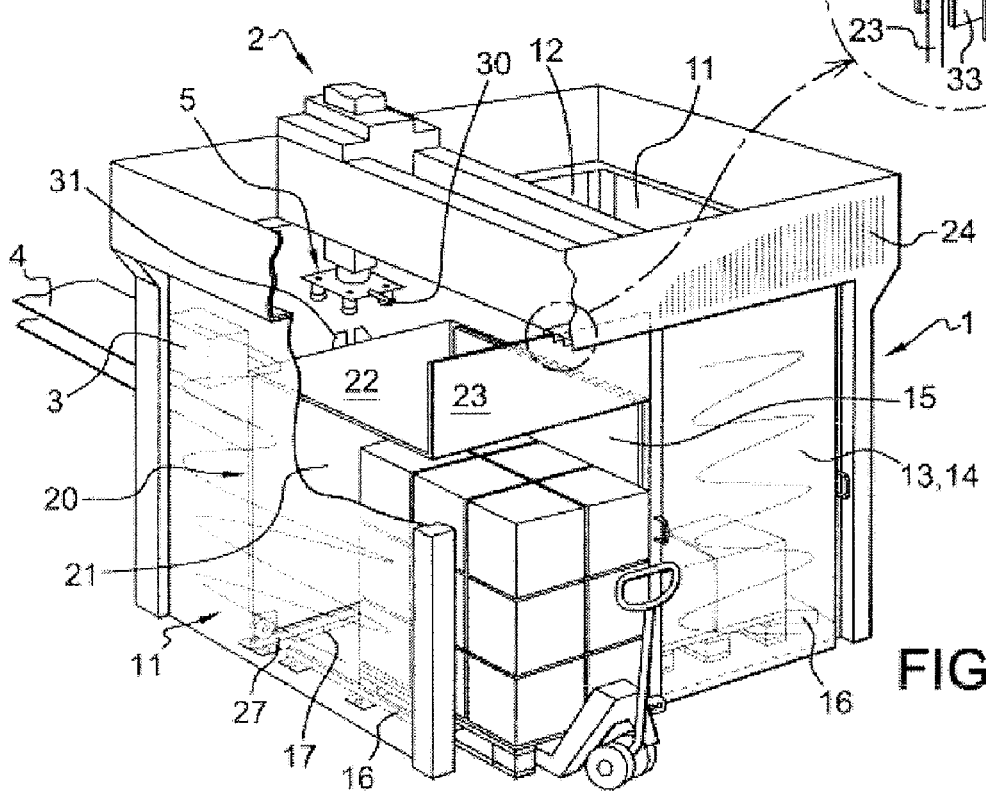

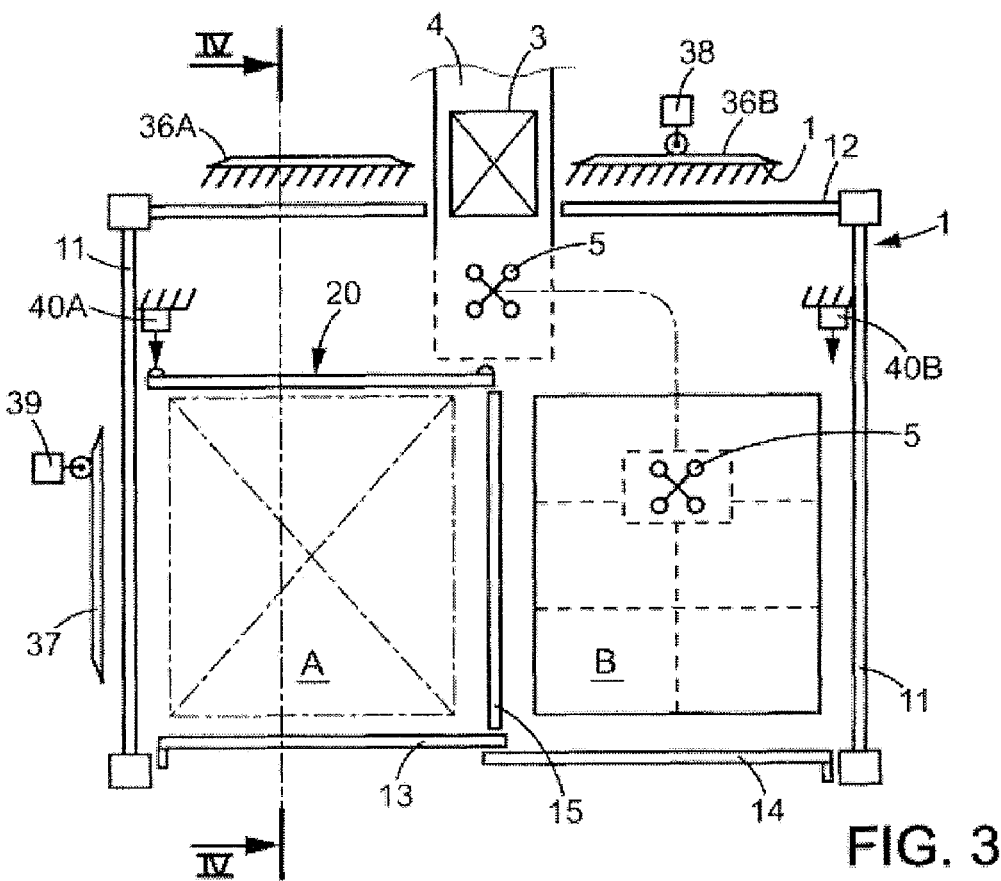
FIG. 3
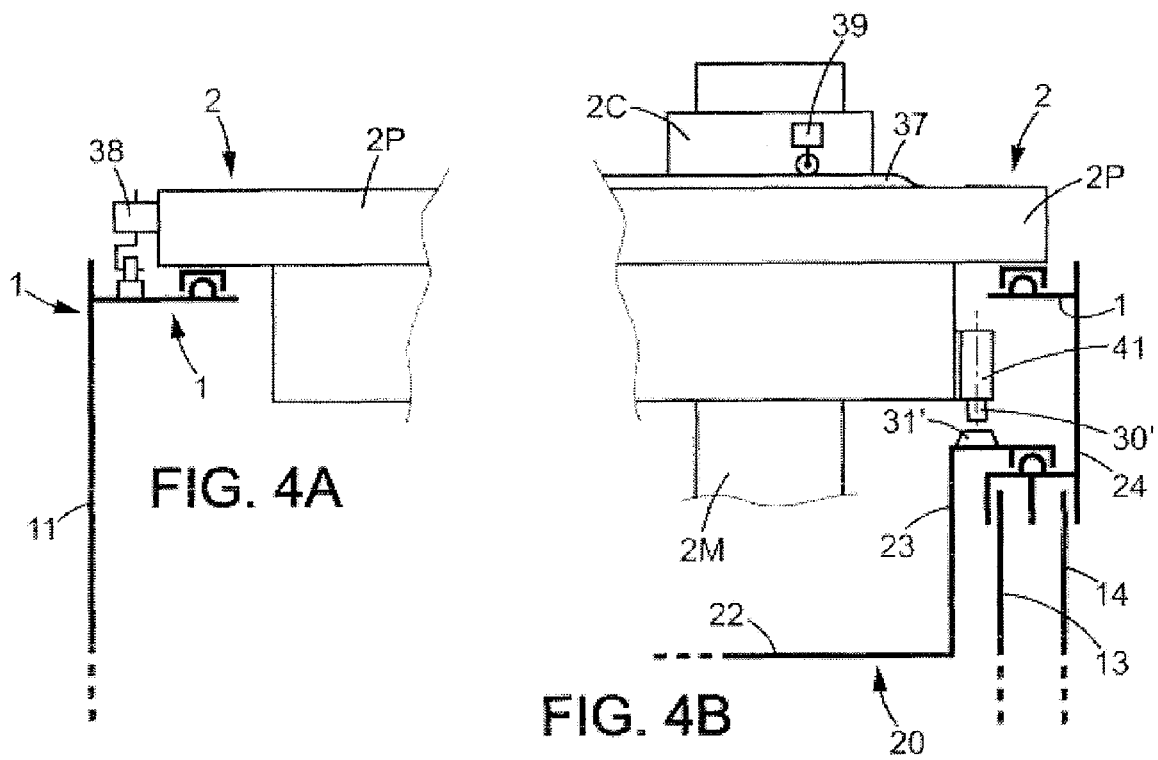
FIG. 4A
FIG. 4B

SECURED PALLETIZATION FACILITY

CROSS REFERENCE TO RELATED APPLICATION

This application is a National Stage of International Application No. PCT/FR2008/051712 filed Sep. 25, 2008, claiming priority based on French Patent Application No. 07 06789, filed Sep. 28, 2007, the contents of all of which are incorporated herein by reference in their entirety.

FIELD OF THE INVENTION

The invention relates to fixed-station palletization facilities where the stations are placed side by side, and in particular to facilities with robots that have a manipulator which alternates between stations in order to load pallets with products, such as crates or other products, supplied by a conveying device.

DESCRIPTION OF THE PRIOR ART

The invention proposes an improvement to this type of palletization facility that aims to increase operator safety, particularly the safety of an operator who is working in the facility when the robot is in operation.

Its aim is to protect the operator in charge of handling the pallets: removing them when they are full or, when they are empty, placing them in the palletizing station which has just been freed.

For facilities which operate with a material handling robot, it is not uncommon for products to be released by the gripping and palletizing head of said robot during the transfer of crates between the conveyer supplying said products and the pallet on which they are placed by said robot.

This type of incident can occur for any type of facility; however, some facilities are more susceptible such as those which have a robot with a gripping and palletizing head equipped with suction cups.

Several phenomena, occurring separately or together, can cause such incidents. Examples are: defects in the packaging which can render the suction cups less effective, problems related to the supply of product to the suction cups, the sudden accelerations the products are exposed to, etc.

Palletizers do, of course, have safety equipment such as barriers and/or doors, as well as light curtains for when the doors are open, for example, but these protective barriers are completely inoperative against "flying" products, meaning products which have been released by the gripping and palletizing head when they are in full motion.

Conventional emergency stop devices are of no assistance in this type of incident.

In palletization facilities which operate continuously, there are moments when the operator is particularly vulnerable: this is notably the case when he is removing a full pallet and in the even more critical case when he is placing a new, empty pallet in the palletizing station that has just been freed.

SUMMARY OF THE INVENTION

The invention proposes an original improvement to this type of palletization facility which aims to provide a concrete and complete protection for the operator, even when the palletizing robot is in operation. The operator does not need to stop the facility to remove a full pallet in complete safety; he can work inside the zone of the full pallet while the robot is preparing the neighboring pallet.

The facility of the invention comprises walls which laterally cover the general structure, or framework, and doors for accessing the palletizing stations, and additionally comprises a system of barriers which is composed of a fixed wall which separates two adjacent palletizing stations, and a mobile cowling which moves from one station to the other, of a dihedral form in order to cover at least the rear and the top of a full pallet. Said lateral walls, said fixed wall, and said cowling cooperate together to transform each palletizing station in turn into a sort of pallet chamber, with said transformation occurring automatically, with the aid of the robot, before the opening of the access door of said station to allow the operator to remove the full pallet and introduce a new empty pallet.

With this arrangement, the operator is automatically isolated from the hazardous zone of the facility; he is completely isolated from the active zone of the facility where the material handling robot and the products transferred by said robot are circulating.

Still according to the invention, the mobile cowling is composed of: —a vertical panel acting as the back of the chamber, —a horizontal panel acting as a ceiling and, depending on the case, —a small front panel which acts as the connection between said ceiling and the beam arranged on the upper part of the structure.

In another arrangement of the invention, the mobile cowling is guided: —on a rail which is arranged at the bottom of the back of the palletizing station, and —on a rail arranged at the front upper beam of the structure.

Still according to the invention, the manipulation of the mobile cowling occurs directly by means of the material handling robot, with said robot comprising a digit for this purpose in the form of a latch which cooperates with a catch on the middle upper part of said cowling.

In another arrangement of the invention, the front upper beam of the structure comprises three rails that form guide rails: one to guide the mobile cowling and two to guide the access doors, said access doors being sliding doors.

Still according to the invention, the facility comprises a means, on the framework, for detecting the position of the cowling in relation to each palletizing station.

In another arrangement of the invention, the facility comprises a means for defining a grid for the areas of intervention of the gripping and palletizing head, said means being composed of cams arranged transversely on the framework, facing the palletizing stations, and longitudinally on the beam supporting the palletizing head, said cams cooperating with contact mechanisms which, by means of an automated control system, and as a function of information on the cowling position, determine the movement possibilities for said gripping and palletizing head.

Still according to the invention, the cowling is transparent, made of thermoplastic material of the polycarbonate, polyethylene terephthalate glycol type.

BRIEF DESCRIPTION OF THE DRAWINGS

The invention is further detailed with the aid of the following description and the attached drawings, provided as an illustration, in which:

FIG. 1 represents a facility of the invention, comprising two palletizing stations; one of the pallets is currently being loaded and the other pallet is full, ready for removal, FIG. 2 shows the removal of the full pallet which was being loaded in FIG. 1 and the start of loading the new pallet, FIG. 3 schematically represents a top-down view of the facility, showing only the zones which are accessible by the gripping and palletizing head, FIG. 4A is a partial schematic elevated cross-sectional view from 4-4 in FIG. 3, showing an embodiment of the rear portion of the facility of the invention, FIG. 4B is also a partial schematic elevated cross-sectional view of FIG. 3 from 4-4, showing an embodiment of the front portion of the facility of the invention.

DETAILED DESCRIPTION OF THE INVENTION

The palletization facility represented in the figures comprises a structure acting as a framework 1, said structure covering two palletizing stations A and B, and supporting a material handling robot 2 with three or four axes, depending on the case, serving said stations A and B. This robot 2 comprises: —a beam 2P which extends longitudinally in the direction in which products 3 arrive and which moves transversely under the effect of appropriate means, —a trolley which is supported by said beam 2P and which moves longitudinally on said beam, and —a pole 2M which is supported and vertically guided by said trolley 2C.

The products 3 to be palletized are supplied by a conveying device 4 in the central rear portion of the facility, and are handled by the robot 2 and in particular by its gripping and palletizing head 5 which is located at the lower end of the pole 2M; this head 5 places the products 3 on the appropriate pallet, which is here the pallet 6 of the station A as represented in FIG. 1.

Still in FIG. 1, the station B is occupied by a full pallet 7, said pallet ready to be removed by means of a machine 8 which is appropriate for pallet transport.

The framework 1 of the facility is enclosed with lateral walls 11 which are transparent and with one wall 12 on its back portion. On the front of the facility, the framework is equipped with two doors 13, 14 which are also transparent; these two doors slide to allow front access to the different palletizing stations.

The palletizing stations A and B are located between the lateral walls 1) and are separated by a wall 15 which is fixed, vertical, and parallel to said lateral walls 11. This wall 15 is also transparent; it extends for a length which is substantially greater than that of the pallets and to a height which is similarly substantially greater than that of said pallets when they are loaded.

These stations A and B comprise in their lower part, on the ground, longitudinal guides 16 and stops 17 in the back, in order to position each pallet 6 and 7 correctly within the frame of reference of the robot 2.

A supplemental barrier in the form of a cowling 20, which has the characteristic of being mobile, cooperates with the various walls described above and in particular with: —the lateral walls 11 and —the wall 15, to delimit temporarily and in an alternating manner the station A and the station B in order to render them accessible selectively and exclusively to either the operator or to the head 5 of the robot 2.

This delimitation allows transforming the station A or B, depending on the case, into a sort of pallet chamber in which the full pallet is enclosed, isolated from the zone in which the head 5 of the robot 2 is moving. The zone comprising the full pallet is accessible to the operator only by one of the front doors 13 or 14.

This cowling 20 is, for example, transparent, made of thermoplastic material such as polycarbonate, polyethylene terephthalate glycol, as are the other walls of the facility. The section of this cowling 20 is in the form of a double dihedral, or zigzag, and comprises:

a vertical panel which forms the back 21 of the chamber and which covers the rear of the pallet when it is full, a horizontal panel acting as a ceiling 22, which covers the top of said pallet, and depending on the case, a small vertical panel 23 on the front, which forms the connection between said ceiling 22 and the front beam 24 which forms the top brace of the structure 1.

The ceiling 22 is located at a level which is as low as possible, compatible with the load height of the pallet of course, to allow the maximum amount of space for the material handling robot 2.

The cowling 20 is mobile between the lateral walls 11 of the framework 1 in order to alternatively cover palletizing stations A or B. In FIG. 1, the cowling 20 is covering station B while in FIG. 2 it is covering station A.

As detailed below, appropriate means, for example dry contacts and relays, control the positioning of the cowling 20 in order to ensure operator safety, and an automated control system coordinates and allows maneuvering the door 13 or 14 providing access to the chamber in which a full pallet is located.

The cowling 20 is guided by rails:

one rail 27 which guides the back 21, said rail 27 placed behind the stops 17 which are located at the rear in the stations A and B for pallets 6 and 7 respectively, a rail 28 arranged, for example, on the beam 24 of the framework 1 in order to guide the upper part of the front panel 23 which extends above the ceiling 22.

The maneuvering of the cowling 20, in order to move it from one station to the other, is done by the robot 2 itself which comprises a means for hooking onto the top of the wall 21 for example.

As represented in FIG. 2, the robot 2 comprises in its head 5 a digit in the form of a latch 30, said latch 30 arranged to cooperate with a catch 31 which is provided in the upper middle part of the back 21 or on the ceiling 22.

Other embodiments for the cowling 20 displacement and guiding means are presented below in relation to FIG. 4.

The front beam 24 of the framework 1 comprises two other rails 33 and 34 for guiding the respective doors 13 and 14. The lower portions of these doors 13 and 14 are also guided by a door shoe 35 which is arranged on the ground, at the front of the facility.

FIG. 3 schematically represents a top-down view of the facility of the invention, notably with its two palletizing stations A and B.

These stations are delimited by the lateral walls 11 of the facility and by the central median wall 15. On the front are found the doors 13 and 14, which are sliding doors, for example, respectively enclosing the station A and the station B.

Also found in FIG. 3 in the form of a simple vertical wall is the cowling 20, which moves from one station to the other to form, together with the median wall 15, the corresponding lateral wall 11, and the door 13 or 14 depending on the case, a sort of chamber at each station A and B.

To supplement in an effective manner all the means implemented to ensure operator safety, the facility comprises means for defining the zone in which the robot 2 can move, particularly its head 5 for gripping and palletizing products 3.

Thus, judiciously placed cams allow defining and dictating the work areas, which correspond to the palletizing stations A and B and to the space between these areas and the conveying device 3 which supplies the facility.

Two cams 36A and 36B are positioned on the framework 1, respectively facing the palletizing stations A and B. Another cam 37, positioned on the beam 2P, faces the two palletizing stations A and B.

In other words, the cams 36A, 36B are arranged transversely, perpendicular to the direction in which the products 3 arrive, while the cam 37 is positioned longitudinally, in the direction said products arrive.

The beam 2P comprises at its rear extremity, as represented schematically in FIG. 4a, a contact type mechanism 38 which cooperates with the cams 36A, 36B.

The trolley 2C also comprises a contact type mechanism 39 which cooperates with the cam 37, said cam being arranged on the beam 2P.

Other means arranged in the facility allow controlling and detecting the position of the cowling 20, and in particular its active closed position at either palletizing station A or palletizing station B.

In FIG. 3, one will note switch type detection mechanisms, with one switch 40A located next to the palletizing station A and one switch 40B located next to the palletizing station B.

Thus, by means of the automated control system, the cam system, combined with the means for detecting the position of the cowling 20, allows dictating a work area to the head 5, said work area corresponding to the station B as represented in FIG. 3, and these various means offer the operator a high level of safety when he is accessing the station A.

FIG. 4B shows another embodiment of the displacement means for the cowling 20, moving in the transverse direction.

This cowling 20 is still guided on the framework 1 and comprises, in its front upper extremity, a catch 31' which cooperates with a latch 30', said latch 30' activated by means of an actuator 41 which is integral with the front part of the robot 2 and in particular with the beam 2P.

The invention claimed is:

1. A palletization facility for products which are manipulated by a robot, said robot being installed in a framework enclosed with lateral walls and doors that provide access to palletizing stations A and B,
wherein said facility comprises a partitioning system which comprises:
a fixed wall which separates two adjacent palletizing stations, and
a mobile cowling which moves from one of said palletizing stations to another of said palletizing stations, of a dihedral form in order to cover at least the rear and the top of a full pallet, and
said lateral walls, said fixed wall, and said cowling cooperate together to transform each palletizing station in turn into a sort of pallet chamber, said transformation occurring automatically, with the aid of said robot, before the opening of the door which gives access to the full pallet, which allows the operator to remove said full pallet.

2. The palletization facility according to claim 1, wherein the cowling is composed of a vertical panel acting as a back of the chamber, a horizontal panel acting as a ceiling, and a small front panel which acts as the connection between said ceiling and a front beam arranged on an upper front part of said framework.

3. The palletization facility according to claim 2, wherein the cowling is guided on a rail arranged at the bottom of the back of the palletizing stations and on a rail arranged on the front upper beam of the framework.

4. The palletization facility according to claim 3, wherein the cowling is manipulated directly by means of the material handling robot, said robot comprising for this purpose a latch which cooperates with a catch arranged on the upper middle part of said cowling.

5. The palletization facility according to claim 3, further comprising, on the front beam of the framework, three rails that form guide rails, one rail to guide the cowling and two rails to guide the respective doors, said doors being sliding doors.

6. The palletization facility according to claim 1, further comprising, on the framework, means for detecting the position of the cowling relative to each palletizing station A and B.

7. The palletization facility according to claim 6, further comprising:
means for defining a grid for the areas of intervention of the gripping and palletizing head, said means composed of cams, some of the cams arranged transversely on the framework, respectively facing palletizing stations A and B, and one of the cants arranged longitudinally on the beam of the robot, said cams cooperating with contact type mechanisms which, by means of an automated control system, and as a function of information on the cowling position, determine the movement possibilities for said gripping and palletizing head.

8. The palletization facility according to claim 1, wherein the cowling is transparent and made of thermoplastic material of the polycarbonate, polyethylene terephthalate glycol type.

9. A palletization facility for products which are manipulated by a robot, said robot being installed in a framework enclosed with lateral walls and doors that provide access to palletizing stations A and B, wherein said facility comprises:
a partitioning system, the partitioning system comprising:
a fixed wall which separates two adjacent palletizing stations,
a mobile cowling which moves from one station to another, of a dihedral form in order to cover at least the rear and the top of a full pallet, and
said lateral walls, said fixed wall and said cowling cooperate together to transform each palletizing station in turn into a sort of pallet chamber, said transformation occurring automatically, with the aid of said robot, before the opening of the door which gives access to the full pallet, which allows the operator to remove said full pallet,
and wherein said cowling is composed of a vertical panel acting as a back of the chamber, a horizontal panel acting as a ceiling, and a small front panel which acts as the connection between said ceiling and a front beam arranged on an upper front part of said framework.

10. A palletization facility for products which are manipulated by a robot, said robot being installed in a framework enclosed with lateral walls and doors that provide access to palletizing stations A and B, wherein said facility comprises:
a partitioning system, the partitioning system comprising:
a fixed wall which separates two adjacent palletizing stations, and
a mobile cowling which moves from one station to another, of a dihedral form in order to cover at least the rear and the top of a full pallet, and said lateral walls, said fixed wall and said cowling cooperate together to transform each palletizing station in turn into a sort of pallet chamber, said transformation occurring automatically, with the aid of said robot, before the opening of the door which gives access to the full pallet, which allows the operator to remove said full pallet, wherein said facility comprises, on the framework, means for detecting the position of the cowling relative to each palletizing station A and B, and wherein said facility comprises means for defining a grid for the areas of intervention of the gripping and palletizing head, including cams arranged transversely on the framework, respectively facing palletizing stations A and B, and a cam arranged longitudinally on the beam of the robot, said cams cooperating with contact type mechanisms which, by means of an automated control system, and as a function of information on the cowling position, determine the movement possibilities for said gripping and palletizing head.

11. A palletization facility for products which are manipulated by a robot, comprising:

a framework including lateral walls and doors that provide access to adjacent palletizing stations disposed within the framework; and a partitioning system, the partitioning system comprising:

a fixed wall disposed between two of the adjacent palletizing stations, separating the adjacent palletizing stations from each other;

a mobile cowling which is movable within the framework, from one of the two adjacent palletizing stations to another one of the two adjacent palletizing stations, the mobile cowling including a shape configured to cover at least a rear and a top of a full pallet disposed in one of the palletizing stations, and when said cowling is positioned to cover at least the rear and the top of the full pallet, said cowling, together with said lateral walls and said fixed wall, form a temporary pallet chamber around the full pallet so as to isolate the full pallet from an adjacent one of the palletizing stations before the door is opened to allow the operator to remove the full pallet from the palletizing station in which the full pallet is disposed.

* * * * *